(12) United States Patent
Wells, Jr.

(10) Patent No.: US 6,508,012 B2
(45) Date of Patent: Jan. 21, 2003

(54) DIGITAL FASTENER SIZE INDICATOR

(76) Inventor: Earnest G. Wells, Jr., 4848 Cedar Ridge Dr., Columbus, GA (US) 31909

( * ) Notice: Subject to any disclaimer, the term of this patent is extended or adjusted under 35 U.S.C. 154(b) by 78 days.

(21) Appl. No.: 09/753,324

(22) Filed: Dec. 30, 2000

(65) Prior Publication Data

US 2002/0083613 A1 Jul. 4, 2002

(51) Int. Cl.[7] .................................................. G01B 5/00
(52) U.S. Cl. ...................... 33/784; 33/199 R; 33/679.1
(58) Field of Search ...................... 33/783, 784, 199 R, 33/555.1, 555.2, 555.3, 706, 679.1

(56) References Cited

U.S. PATENT DOCUMENTS

| | | | |
|---|---|---|---|
| 552,238 A | * 12/1895 | Darlins | 33/199 R |
| 4,138,820 A | 2/1979 | O'Connor | |
| 4,375,722 A | 3/1983 | Nishikata et al. | |
| 4,419,824 A | 12/1983 | Oberhans | |
| 4,578,868 A | * 4/1986 | Sasaki et al. | 33/706 |
| 4,730,399 A | 3/1988 | Campbell | |
| 4,745,685 A | 5/1988 | Castillo | |
| 4,845,646 A | 7/1989 | Marquis et al. | |
| 4,876,800 A | 10/1989 | Pekar et al. | |
| 4,908,955 A | 3/1990 | Nicholson | |
| 4,941,267 A | * 7/1990 | Miller, Jr. | 33/700 |
| 4,955,140 A | 9/1990 | Greenslade | |
| 5,067,249 A | * 11/1991 | Terrigno | 33/773 |
| 5,095,638 A | 3/1992 | David et al. | |
| 5,131,162 A | * 7/1992 | Miller | 33/199 R |
| 5,148,612 A | 9/1992 | Walser et al. | |
| 5,177,874 A | 1/1993 | Ogorek | |
| 5,191,720 A | * 3/1993 | Miura et al. | 33/501 |
| 5,249,366 A | * 10/1993 | Takahashi et al. | 33/512 |
| D340,874 S | 11/1993 | Nicholson | |
| 5,345,636 A | 9/1994 | Lamons | |
| 5,363,562 A | 11/1994 | Schmidt | |
| 5,548,903 A | 8/1996 | Johnson et al. | |
| 5,619,805 A | 4/1997 | Greenslade | |
| 5,664,921 A | 9/1997 | Leslie | |
| 5,875,558 A | 3/1999 | Bakke et al. | |
| 6,145,207 A | * 11/2000 | Brunson | 33/199 B |
| 6,205,672 B1 | * 3/2001 | Paulsen et al. | 33/203 |
| 6,360,450 B1 | * 3/2002 | Turner | 33/542 |

* cited by examiner

Primary Examiner—Diego Gutierrez
Assistant Examiner—Lydia M. De Jesús
(74) Attorney, Agent, or Firm—Hinkle & O'Bradovich, LLC

(57) ABSTRACT

A digital fastener size indicator having a housing. A fixed jaw extends from an end of the housing, while a movable jaw extends from the end of the housing adjacent to and parallel with the fixed jaw. A digital electrical length measuring circuit within the housing is connected to the movable jaw. When the movable jaw and the fixed jaw encompass a fastener and the digital electrical length measuring circuit is activated a digital readout will be presented in the housing of a single discrete number to an operator to indicate the size of the fastener.

4 Claims, 4 Drawing Sheets

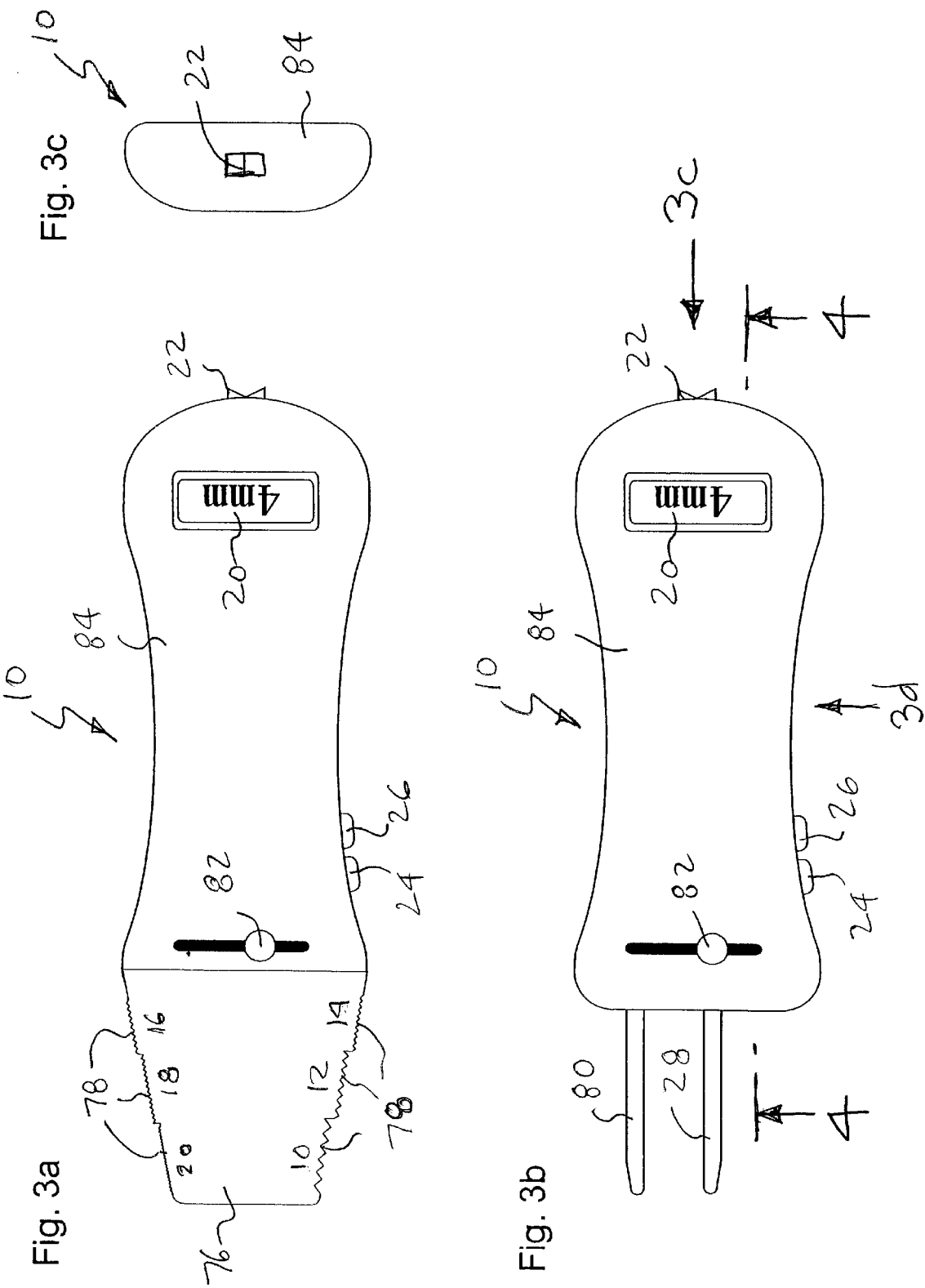

DIGITAL FASTENER SIZE INDICATOR

BACKGROUND OF THE INVENTION

I. Field of the Invention.

The present invention relates generally to measuring apparatuses. More particularly, the invention comprises an indicator system which specifically measures the size of fasteners by digital technology. Typically, the fasteners would be common nuts and bolts.

In general, a first field of use of the disclosed invention are the unique advantages of the instant invention for manufacturers of nuts and bolts. However, many other fields, such as for use by manufacturers of various small components and the like, could find potentially beneficial uses of this invention. Further, individuals, such as mechanics and the like, are obvious users of this invention.

Thus, it can be seen that the potential fields of use for this invention are myriad and the particular preferred embodiments described herein is in no way meant to limit the use of the invention to the particular field chosen for exposition of the details of the invention.

A comprehensive listing of all the possible fields to which this invention may be applied is limited only by the imagination and is, therefore, not provided herein. Some of the more obvious applications are mentioned in the interest of providing a full and complete disclosure of the unique properties of this previously unknown general purpose article of manufacture. It is to be understood from the outset that the scope of this invention is not limited to these fields or to the specific examples of potential uses presented herein.

II. Description of the Related Art.

Presently, in order to determine the size of a nut or bolt head, one uses a trial and error method for fitting different size wrenches over the nut or bolt head until one discovers which wrench fits perfectly. Wrenches are heavy and cumbersome, and time and effort is consumed in this trial and error method because one must keep returning to the tool box to find another size wrench until the right size is finally chosen. Sometimes, nuts and bolts are located in tight spaces where a wrench cannot reach with facility, thus creating a greater waste of time and effort as the user attempts to discover the proper wrench size to use.

The hand and eye comparison method is also used to measure the size of the threads in a particular bolt. Once again, the common process is to compare (or even count) the size of the threads in an existing bolt with the size of the threads in a replacement bolt until one finds a replacement bolt with the correct dimensions. This is time consuming, clumsy and often inaccurate.

In the past, inventors created several types of measuring devices with an infinite scale to measure the distance across the flats of a head of nuts and bolts. Also, there have been paper, cardboard, plastic or metal templates made with individual measuring elements incorporated for measuring bolt head sizes, bolt diameters, etc. Such features generally include a plurality of apertures of different diameters, appropriately sized for the various diameters of bolts.

Various devices are well known in the prior art which deal with measuring apparatuses, and these include U.S. Pat. No. 1,700,857 issued to Schultz which describes a Hem Gauge having a continuously graduated scale with an elongated slot down the center thereof. A slide with an index is installed within the slot. The device is used by placing the first end of the scale at the origin of the length or distance to be measured, and sliding the index to the appropriate measurement point. The length or distance is then read off the scale point aligned with the index, as with a conventional ruler or measurement scale. In contrast, the present invention provides for the precise determination of the most common sizes of nuts and bolts, and has no provision for an infinitely adjustable or readable scale.

U.S. Pat. No. 4,138,820 issued to O'Connor describes a metric gauge including a planar body having formed therein a plurality of integral sockets of varying sizes for wrench size, nut size, bolt size and screw length measuring purposes. Each of the sockets is downwardly formed below the hexagonal configuration area in a hollow cylindrical shape of varying diameter to thereby easily measure the diameter of a bolt by inserting the bolt into one socket after another until the correct diameter is gauged. Again, it appears that the design is intended only for the sorting of mixed nuts, bolts and screws into groups of identical sizes. The planar body of this gauge makes use in practical applications difficult as well.

U.S. Pat. No. 4,138,820 issued to Nishikata et al describes a vernier caliper having a scale body formed of two parallel rods. The device functions in the manner of earlier known vernier calipers, but structural advantages are alleged with the Nishikata et al. caliper, due to the parallel rod body structure. A vernier provides for the reading of dimensions comprising an unbroken continuum of sizes, and includes a secondary vernier scale for finer readings. In contrast, the present invention only includes a limited number of finite standard and metric sizes of nut and bolt dimensions with a single readout on a liquid crystal display, thereby providing the size of the fastener and the corresponding wrench or socket size required.

U.S. Pat. No. 4,730,399 issued to Campbell describes a wheel bolt circle gauge structurally somewhat resembling a vernier caliper. An elongated scale includes a tapered or conical tip, with a slide body having a single scale-viewing window therein and a tapered or conical tip extending therefrom. The scale and corresponding opposite edges of the single window each include a different scale thereon, with one scale slide and window edge providing a series of numbers corresponding to metric dimensions and the opposite side and edge having a set of numbers for inch dimensions. The use of a single window to view all of this information results in a need for a separate table on the scale body for the interpretation of the numbers. The integrated circuit of the present invention permits the information to be obtained in a single operation with no requirement to check a secondary table or the like.

U.S. Pat. No. 4,745,685 issued to Castillo describes a movable jaw measuring apparatus, in which one edge of the jaw is aligned with one of a series of index marks provided on the body of the device when a bolt or nut is measured therein. All of the index marks and their corresponding numbers are visible simultaneously, unlike the liquid crystal display screen of the present invention, which precludes viewing of the entirety of more than the single correct number at any one time. The long index mark leads required by Castillo in order to fit all the fractional numbers on the body of the device are somewhat confusing, and it would be easy to err by visually following an incorrect line to one of the numbers on the body and thereby secure the wrong wrench for the measured nut or bolt.

U.S. Pat. No. 5,345,636 issued to Lamons describes a multi-tool adjustable wrench having a vernier scale on the adjustable wrench jaws. The limitations and disadvantages of a continuously reading and displaying vernier scale, as opposed to the discontinuous incremental readouts provided with the present invention have been discussed further above. A single correct digital readout is displayed on the liquid crystal display screen of the present invention at any one time. Moreover, the present invention is not a wrench, and is not adapted to provide mechanical force or mechanical advantage to a fastener. The present invention measures the width of a nut or bolt head to provide for the selection of an appropriately sized wrench or socket.

U.S. Pat. No. 5,664,921 issued to Leslie describes a fastener component, such as a nut, which has size indicia thereon. The size indicia is used to identify the size of a wrench suitable for adjusting the nut when threaded onto a bolt, without taking measurements. Removal of nuts and bolts found on current machinery and replacing them with Leslie's fastener components would be time consuming and costly. Even if that were not the case, if all fasteners contained size indicia thereon, some fasteners will be located in areas where the raised or recessed numeral is not visible. If this were the case, fastener components would have to be sized by trial and error which would be time consuming and inefficient.

U.S. Pat. No. 5,875,558 issued to Bakke et al describes a measuring tool having a plurality of templates, each template having a socket opening therein. The templates are of ten different sizes with the larger nut socket located in the longer template, while the templates are pivotally mounted together. The operator determines the suitable size wrench to use by alternating templates on a nut or bolt until the correct socket opening is obtained. Again, the present invention with its integrated circuit corresponding precisely to the predetermined incremental dimensions of standardized and metric sizes of nuts and bolts ensures that a single correct digital readout is displayed on the liquid crystal display screen at any one time. As such, the appropriate wrench or socket needed to adjust a nut or bolt can be determined quickly without having to size fastener components using the time consuming and inefficient trial and error approach.

U.S. Patent D-319,404 issued to Jackson, Sr. describes a design for a bolt head and nut sizing gauge. The device has the general configuration of a conventional blade type feeler gauge, in that multiple blades are provided which pivotally fold from and into a housing. Each blade includes a plurality of different slots, each of which matches a differently sized nut or bolt head of standard dimensions. As no dimensional markings are indicated, it appears that the design is intended only for the sorting of mixed nuts and bolts into groups of identical sizes, with no concern being given to the determination of the specific sizes. Thus, the device cannot function as a wrench selector, as even after determining that a given fastener will fit precisely into a corresponding given slot of the Jackson, Sr. device, one still does not know the numerical dimension of the fastener and hence cannot match it up numerically with a dimensionally numbered socket or wrench.

German Patent 311,075 issued to Felsch describes a vernier caliper having slightly spread jaws. The jaws are incrementally marked from zero to five, and provide for the measurement of objects therebetween. The device appears to provide for relatively fine measurement of dimensions, in the manner of a vernier scale, but is easier to read due to the widely spread dimensional markings along the tapered jaws. The constant taper of the jaws, and infinite variation in dimensions of objects, obviously provides for measurements which do not always precisely correspond with any of the markings on the caliper jaws. Again, the present invention, with its integrated circuit corresponding precisely to the predetermined incremental dimensions of standardized and metric sizes of nuts and bolts ensures that a single correct digital readout is displayed on the liquid crystal display screen at any one time.

British Patent 632,671 issued to Nusshold describes a vernier caliper gauge, which includes a micrometer therewith for even more accurate readings. However, the same disadvantages apply to the Nusshold instrument as to most others discussed above, in that the device is adapted for the measurement of practically infinite dimensional variations subject to judgment and moreover being quite difficult to read accurately. The present invention is adapted for the reading of the dimensions of hardware, which is available in a predetermined limited number of standard and metric sizes, and accordingly need not include the complications of verniers and micrometers. The liquid crystal display screen, with only a single reading displayed at any one time, provides quick and accurate measurements at a glance.

None of the above inventions and patents, taken either singly or in combination, is seen to describe the instant invention as claimed. Accordingly, the invention a digital nut and bolt size indicator will overcome the shortcomings of the prior art devices.

BRIEF SUMMARY OF THE INVENTION

The present invention being a digital nut and bolt size indicator concerns an electronic apparatus for measuring nut and bolt sizes. The present invention measures both the shank diameter and the head size of various bolts, and digitally displays the same by utilizing algorithims programmed into an integrated circuit. An operator will place two measuring jaws of the indicator closely adjacent to the nut or bolt which is to be measured, and will then be able to read the size on the digital readout. The digital readout will be of a single discrete number so that the operator will not have to interpret between several numbers, which might be presented to the operator in the manner of a mechanical system.

From the description above, a number of advantages of the digital nut and bolt size indicator become evident. The indicator is easy to operate using only one hand, thereby precluding a situation wherein each measurement requires both hands and the indicator must be set down in order that a wrench or socket may be picked up to complete the operation. The size and shape of the indicator permits it to be inserted one-handed into an area of limited space and visibility to measure a nut or bolt head.

When desiring to make a fastener measurement the operator takes the measurement by moving the movable jaw until the jaws come into contact with the fastener. The operator can perform this operation by moving the movable jaw unit or by pushing a thumb slide until contact is made with the fastener. The latter option is especially useful when the operator is in an area of limited space or visibility.

It is not necessary that the operator read the measurement while the indicator is so engaged and in fact such visual inspection might not be possible. The indicator may be withdrawn after the measurement and the reading made at the convenience of the operator.

The cover of the indicator may include serrations around the outside edges for measuring the number of threads per inch of any number of standard fasteners.

The indicator has an automatic calibration feature that is activated as needed.

A mode switch (not shown) allows the operator to expand the measurement capabilities of this invention. If the mode switch is pressed, nut or bolt size measurements can be made. Otherwise, bolt diameter measurements are possible.

The operator has the option to illuminate a liquid crystal display at his/her discretion by activating a light on/off switch.

The indicator provides a better way for home and professional operators to quickly determine the appropriate size wrench or socket needed to adjust a nut or bolt. As such, use of the indicator can reduce the time required to provide a service since the operator would not need to make multiple trips to a toolbox for the right size socket or wrench.

The invention is simple, easy to use and is economical to manufacture. The invention provides improved elements and arrangements thereof in an apparatus for the purposes described which is inexpensive, dependable and fully effective in accomplishing its intended purposes.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 3a is a top plan view of the present invention;

FIG. 3b is a top plan view similar to FIG. 3a with the jaw cover removed;

FIG. 3c is an end view taken in the direction of arrow 3c in FIG. 3b;

DESCRIPTION OF THE PREFERRED EMBODIMENT

Figure 1:
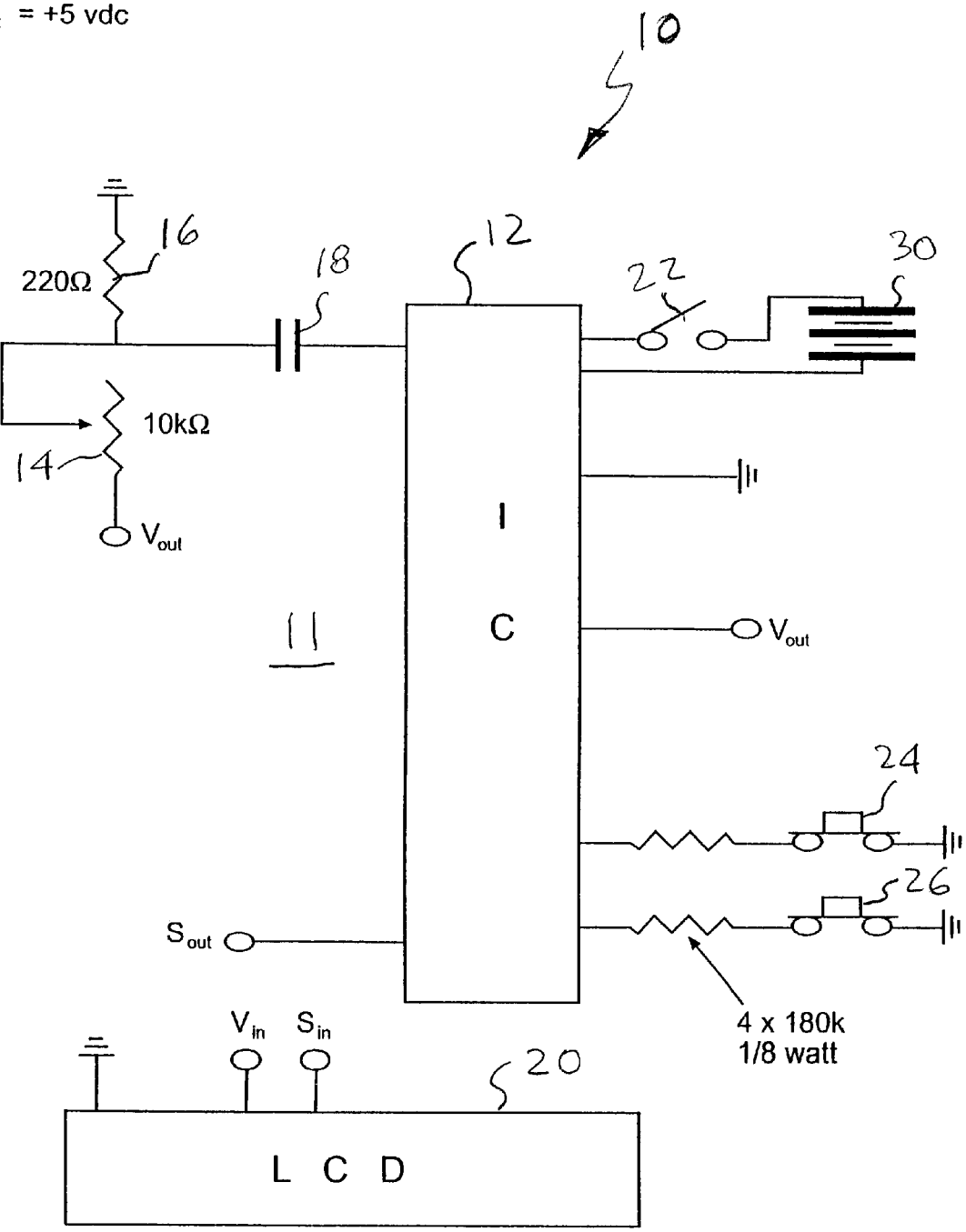
FIG. 1 is a circuit diagram of the present invention.

For a fuller understanding of the nature and desired objects of this invention, reference should be made to the following detailed description taken in connection with the accompanying drawings. Referring to the drawings wherein like reference numerals designate corresponding parts throughout the several figures, reference is made to FIGS. 1 through 4 which illustrate various components of the present invention being a digital nut and bolt size indicator 10.

A circuit diagram of the digital nut and bolt size indicator 10 is illustrated in FIG. 1. This circuit 11 includes a highly integrated, application specific integrated circuit 12 that performs the required processing and input/output functions of the indicator 10. Included within integrated circuit 12 are a micro controller and a program (not shown). A potentiometer 14 is operatively coupled to a resistor 16 and provides a resistance, which varies proportionately with the fastener size. The resistor 16 provides a stable resistance against which the integrated circuit 12 will compare the variable resistance of the potentiometer 14. The potentiometer 14 regulates the rate of discharge of a capacitor 18 giving the value for "D" rctime.

A liquid crystal display 20 is coupled to the integrated circuit 12 and provides a display of the fastener size received from the integrated circuit 12. The circuit 11 further includes a power on/off switch 22, the switch 22 being coupled to the integrated circuit 12. The circuit 11 includes buttons 24 and 26, which are coupled to the integrated circuit 12, and is responsive to closures of these buttons 24 and 26 in accordance with an algorithm programmed with the integrated circuit 12. When an operator presses the reset button 24, the circuit 11 begins by sending a signal to the integrated circuit 12 to initiate a reading. The indicator 10 then waits until a stable reading is achieved and calculates the size of the fastener. The fastener size is then outputted to the liquid crystal display 20 and remains displayed until the operator reinitializes the reset button 24.

The preferred embodiment of this invention would be implemented by repositioning the reset button 24, so that the movable jaw 28 of the mechanism rests and returns to an initial position resulting in the reset button 24 being automatically activated at the start of a new reading. This is a minor mechanical adjustment to the present embodiment. No modifications to the algorithm of the integrated circuit 12 are required. It will be obvious to those skilled in the art that various changes and modifications may be made therein without departing from the scope of this invention. Readouts are displayed on the illuminated liquid crystal display 20. If no illumination is desired, the operator simply presses the light on/off button 26. A battery 30 is coupled to the integral circuit 12. The integrated circuit 12 has a built-in power down function that places the integrated circuit 12 in a 'sleep' mode to conserve battery usage. Once the operator has initiated a reading, the 'sleep' function is deactivated.

Figure 2:
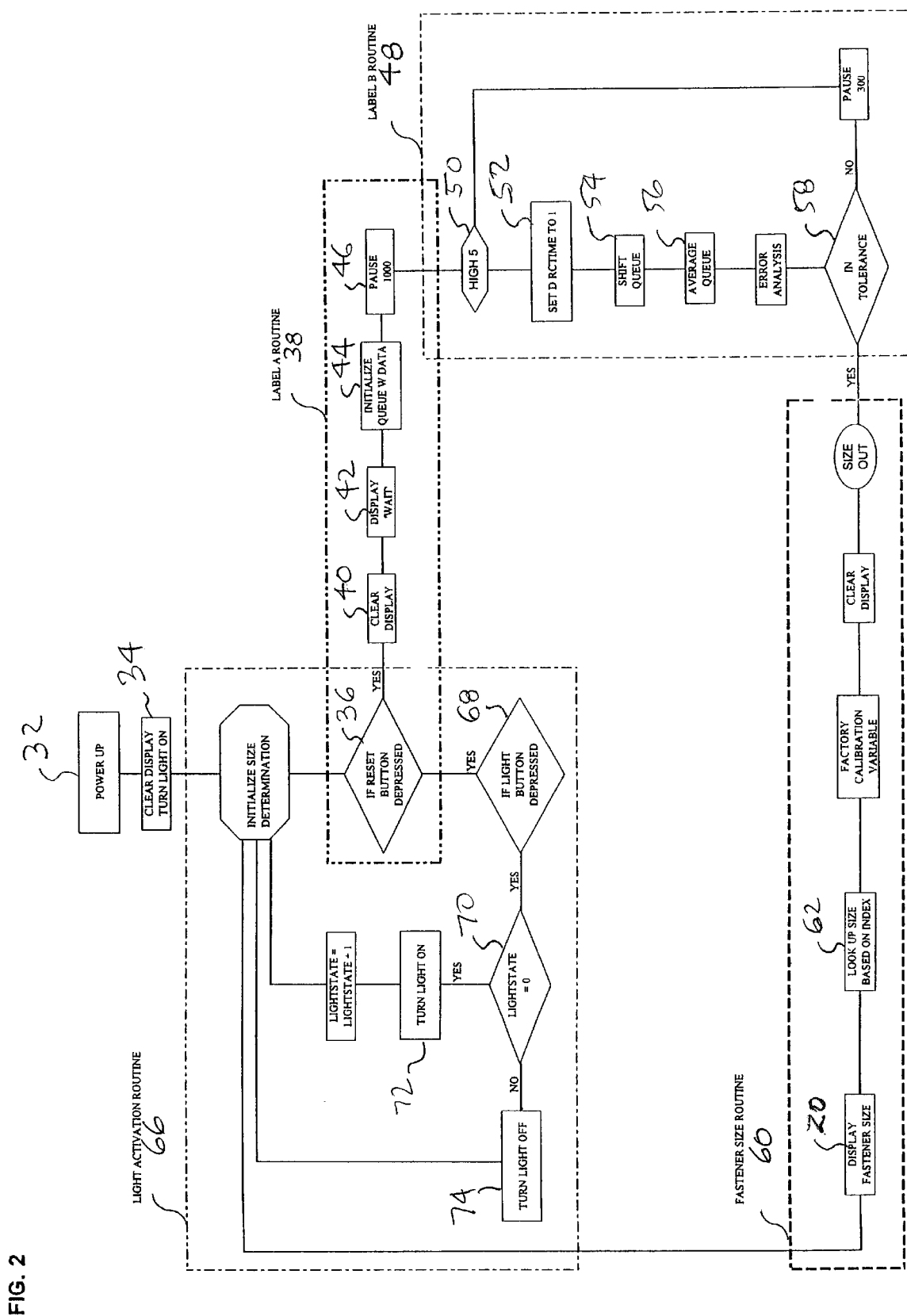
FIG. 2 is a flow chart showing use of the present invention.

An algorithm programmed within the integrated circuit 12 controls an operation of the digital nut and bolt size indicator 10. The flow chart of FIG. 2 illustrates the algorithm used in this invention. Initially, the power on/off switch 22 is depressed to initiate a power up sequence, as shown by 32. During the power up the micro controller is initialized, counters are set to zero and the program begins. The integrated circuit 12 then activates all display segments and turns on the liquid crystal display 20 display light 34. If the reset button 24 is depressed at 36, the micro controller advances to a label A routine 38 in the program code.

After the program advances to the label A routine 38, the integrated circuit 12 clears the liquid crystal display 20 as shown at 40, and displays a text message 42 entitled "WAIT". The integrated circuit 12 then initializes an internal queue 44 with invalid data for the purpose of error analysis. This is followed by a pause 46 to allow the user time to adequately place the device before starting a label B routine 48.

After the program advances to the label B routine 48, the integrated circuit 12 is initialized as indicated at 50. The next step within the label B routine is to initialize a rctime "D" 52 within the input circuit 14, 16 and 18. The resistance of the potentiometer 14 is then sampled(not shown) to determine the size associated with the fastener. The integrated circuit 12 shifts the data in a queue 54 and then performs an averaging function to determine the error percentage of user movement 56. If the percentage is within normally accepted boundaries 58, then the integrated circuit 12 advances to a fastener size routine 60. If the error percentage is not within acceptable limits, the integrated circuit 12 reinitializes at 50 to re-sample another reading. The program enters into a loop until the readings are acceptable.

Once the program advances to the fastener size routine 60, a look-up table is utilized to determine the fastener size based on an index value 62. The fastener size is displayed on the liquid crystal display 20. Readouts remain on the liquid crystal display 20 until the reset button 24 is activated at the start of the next reading. The program now advances to a light activation routine 66.

If the light on/off button 26 is depressed as shown at 68, the first step within the light activation routine 66 is to check a lightstate control variable 70 and determine the current condition of a backlight on the liquid crystal display 20. Then based on the current condition of the backlight, the integrated circuit 12 executes code to bring about the opposite condition and changes the lightstate variable 72 and 74 to reflect this condition. As the program advances, the status of the backlight is continuously monitored in the background, turning the light on and off in response to user activation.

Figure 3D:
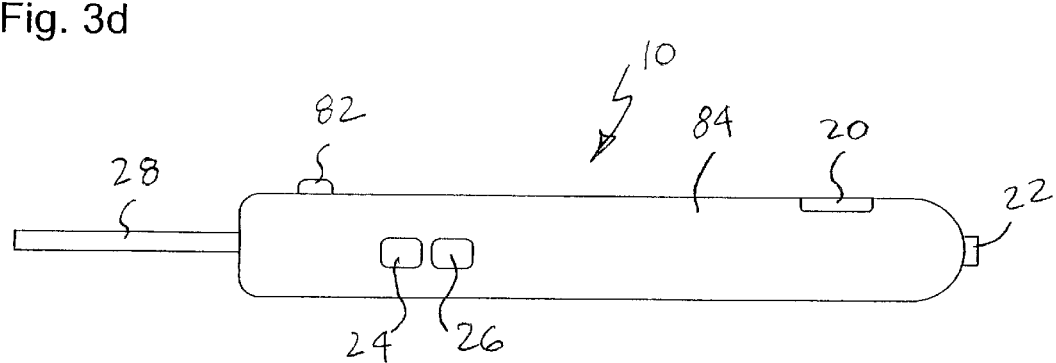
FIG. 3d is a side elevation view taken in the direction of arrow 3d in FIG. 3b.

A top plan view of the digital nut and bolt size indicator 10 is illustrated in FIGS. 3*a* and 3*b*. FIG. 3*c* is an end view, while FIG. 3*d* is a side view. FIG. 3*a* illustrates the top plan view with a cover 76 and FIG. 3*b* illustrates the top plan view without the cover 76. The cover 76 includes a plurality of a series of serrations 78. The length of each series of serrations 78 corresponds to a desired predetermined length of thread pitch. There can be indicia adjacent to each series of serrations 78 to indicate the number of threads per inch corresponding to each particular thread pitch. The digital nut and bolt size indicator 10 includes two types of jaws, a fixed jaw 80 and the movable jaw 28. The movable jaw 28 is normally held open by a spring (not shown). The distance between the jaws 28, 80 indicates the width of the fastener or the distance being measured. The movable jaw 28 can be moved either by pushing the jaw directly or by using a thumb slide 82 to move the jaw. The liquid crystal display 20 displays a single digital readout of the fastener size at any one time.

Figure 4:
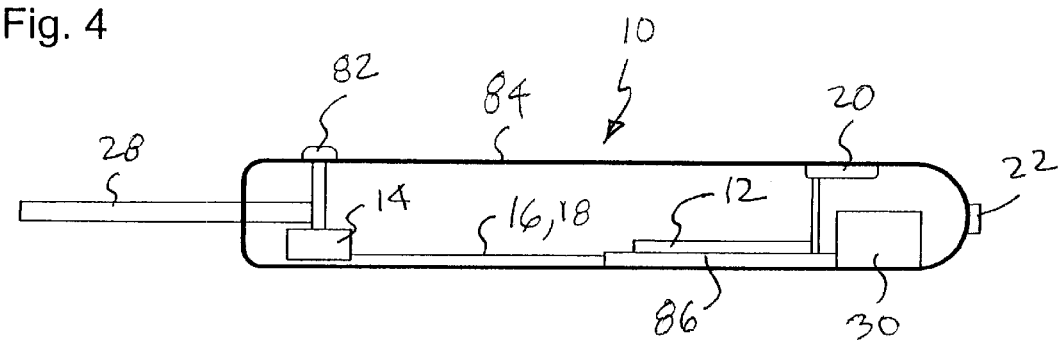
FIG. 4 is a diagrammatic cross sectional view taken generally along line 4—4 in FIG. 3b.

A cross sectional view of the digital nut and bolt size indicator 10 is illustrated in FIG. 4. A housing 84 is shown as well as a printed circuit board 86. The printed circuit board 86 is employed to secure and interconnect the components illustrated in FIG. 1 with the exception of the potentiometer 14. Conductors 16 and 18 are further included to electrically connect the potentiometer 14 to the printed circuit board 86 for ultimate coupling with the integrated circuit 12. FIG. 4 further illustrates the placement of the thumb slide 82 on the potentiometer 14. The thumb slide 82 is then mounted to the movable jaw 28 to facilitate the two modes of operation for the operator. The battery 30 is shown within the housing 84 to provide power to the digital nut and bolt size indicator 10 while maintaining portability.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A digital fastener size indicator comprising:

a housing;

a fixed jaw extending from an end of said housing;

a movable jaw extending from said end of said housing adjacent to and parallel with said fixed jaw;

a digital electrical length measuring circuit within said housing connected to said movable jaw, so that when said movable jaw and said fixed jaw are placed to encompass a fastener said digital electrical measuring circuit is activated to present a digital readout in said housing of a single discrete number to indicate size of the fastener;

a thumb slide in a transverse slot in said housing coupled to said movable jaw, so that said thumb slide can move said movable jaw towards and away from said fixed jaw;

a cover fitted over said fixed jaw and said movable jaw is removably connected to said end of said housing; and thread measuring means on said cover for measuring the pitch of threads on a fastener.

2. The digital fastener size indicator as recited in claim 1, wherein said thread measuring means includes a plurality of a series of serrations along sides of said cover in which each said series of serrations corresponds to a desired predetermined length of thread pitch.

3. The digital fastener size indicator as recited in claim 2, wherein indicia is placed adjacent to each said series of serrations to indicate the number of threads per inch corresponding to each particular thread pitch.

4. The digital fastener size indicator as recited in claim 1, wherein said digital electrical length measuring circuit includes:

a highly integrated application specific integrated circuit having a micro controller and a program;

a capacitor electrically connected to said integrated circuit;

a resistor electrically connected to said capacitor;

a potentiometer electrically connected to said resistor;

a liquid crystal display electrically connected to said integrated circuit;

a power on/off switch electrically connected to said integrated circuit;

a reset button electrically connected to said integrated circuit;

a light on/off switch electrically connected to said integrated circuit; and a battery electrically connected to said integrated circuit to provide power thereto.

* * * * *